United States Patent [19]
Yard

[11] 3,824,856
[45] July 23, 1974

[54] HIGH-PRESSURE ELECTROMAGNETIC FLOWMETER

[75] Inventor: John S. Yard, Warminster, Pa.

[73] Assignee: Fischer & Porter Co., Warminster, Pa.

[22] Filed: Jan. 22, 1973

[21] Appl. No.: 325,633

[52] U.S. Cl. .......................................... 73/194 EM
[51] Int. Cl. ............................................. G01f 1/00
[58] Field of Search ............................... 73/194 EM

[56] References Cited
UNITED STATES PATENTS

| | | | |
|---|---|---|---|
| 3,108,474 | 10/1963 | Sasaki et al. | 73/194 EM |
| 3,274,831 | 9/1966 | Cushing | 73/194 EM |
| 3,334,518 | 8/1967 | Miyamichi | 73/194 EM |
| 3,695,104 | 10/1972 | Mannherz et al. | 73/194 EM |
| 3,745,824 | 7/1973 | Mannherz et al. | 73/194 EM |

FOREIGN PATENTS OR APPLICATIONS

| | | | |
|---|---|---|---|
| 1,072,521 | 6/1967 | Great Britain | 73/194 EM |
| 798,997 | 11/1968 | Canada | 73/194 EM |

Primary Examiner—Charles A. Ruehl

[57] ABSTRACT

An electromagnetic flowmeter having a thin-wall, non-magnetic flow tube surrounded by coils to establish an electromagnetic field in the flow passage. A heavy-wall case is supported concentrically with respect to the flow tube to define an annular region occupied, in part, by the coils and filled with a rigid potting compound, whereby the thin-wall flow tube which minimizes eddy current losses and satisfies the requirement for electromagnetic efficiency, is physically reinforced by the case and is rendered capable of withstanding heavy fluid pressures.

6 Claims, 3 Drawing Figures

PATENTED JUL 23 1974 3,824,856

HIGH-PRESSURE ELECTROMAGNETIC FLOWMETER

BACKGROUND OF THE INVENTION

This invention relates generally to electromagnetic flowmeters, and more particularly to an improved insert-type flowmeter using a thin-flow tube and yet having a high pressure rating.

Magnetic flowmeters are adapted to measure the volume rates of those fluids which present difficult handling problems, such as corrosive acids, sewage, slurries, detergents, and the like. In a magnetic flowmeter, a magnetic field is generated that is mutually perpendicular to the longitudinal axis of the meter pipe through which the fluid flows and to the axis of the meter electrodes. Since the velocity of the fluid is directed along the longitudinal axis of the pipe, the voltage induced within the fluid will be perpendicular to both the velocity of this fluid and the flux linkages of the magnetic field. Thus the metered fluid constitutes a series of fluid conductors moving through the magnetic field. The more rapid is the rate of flow, the greater the instantaneous value of the voltage established at the electrodes.

The standard magnetic flowmeter is provided with a flow tube having end flanges, whereby the flow tube may be interposed between adjoining line pipes of substantially the same diameter, which pipes conduct the fluid whose flow is to be metered. The flanges of the interposed flow tube are bolted or otherwise secured to the flanges on the adjoining pipes in the fluid line.

In a magnetic flowmeter arrangement of the standard type, the flow tube is subjected to the same pressure as the pipes in the line. The flow tube must therefore be of a material and thickness sufficient to withstand this pressure, even though the strength of the flow tube is unrelated to its measuring function.

Because in a standard flowmeter the electromagnetic coils are disposed outside of the flow tube, this tube must be of non-magnetic material. When using a non-magnetic metal flow tube, its wall thickness is preferably thin in order to minimize eddy current losses and to provide adequate field strength within the tubular flow passage without excessive power consumption and without undue heating of the coils and of the wall of the tube.

Since the fluid pressure rating of a standard magnetic flowmeter is determined mainly by the thickness of the flow tube wall, whereas the efficiency of the electromagnetic system is inversely related to wall thickness, any attempt to increase the pressure rating of a standard flowmeter by using a heavier gauge pipe for the flow tube would be at the expense of the efficiency of the electromagnetic system.

SUMMARY OF INVENTION

In view of the foregoing, it is the main object of this invention to provide an electromagnetic flowmeter having a thin-wall flow tube surrounded by coils to produce an electromagnetic field having adequate field strength, the flowmeter nevertheless having a high pressure rating.

More specifically, an object of this invention is to provide a flowmeter of the above-noted type wherein the high-pressure characteristics are imparted thereto by means of a thick-wall cylindrical case concentric with the thin-wall flow tube, the annular region therebetween being filled with a rigid potting compound.

Also an object of this invention is to provide a technique for facilitating the fabrication of a flowmeter of the above-noted type.

Briefly stated, these objects are attained in a flowmeter structure including a thin-wall, non-magnetic flow tube about which are disposed electromagnetic coils to create a field within the flow passage. A thick-wall, high-strength case is supported concentrically about the flow tube to define an annular region occupied, in part, by the coils and filled with a potting compound, whereby the flow tube which satisfies the requirement for electromagnetic efficiency is physically reinforced by the case and is rendered capable of withstanding heavy fluid pressures.

OUTLINE OF THE DRAWING

For a better understanding of the invention as well as other objects and further features thereof, reference is made to the following detailed description to be read in conjunction with the accompanying drawing, wherein.

DESCRIPTION OF INVENTION

Figure 1:
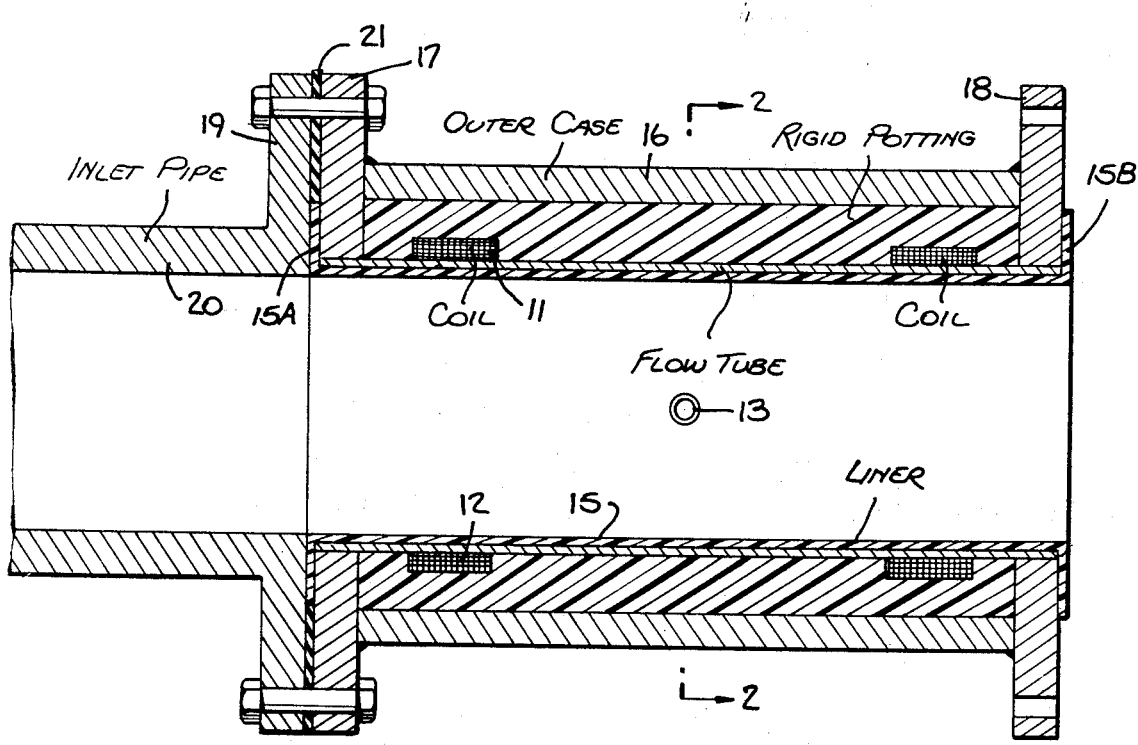
FIG. 1 is a longitudinal section taken through a magnetic flowmeter in accordance with the invention.
Figure 2:
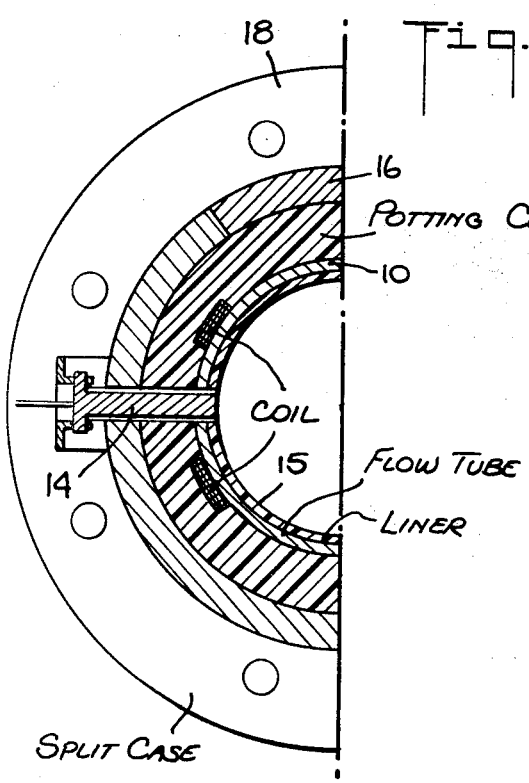
FIG. 2 is a transverse section taken in the plane indicated by line 2—2 in FIG. 1.
Figure 3:
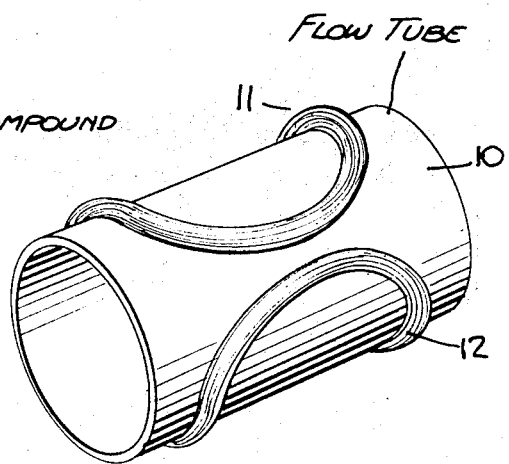
FIG. 3 is a perspective view showing the flow tube and coils included in the meter.

The magnetic flowmeter includes a cylindrical flow tube 10, formed of a thin-wall, non-magnetic material such as non-magnetic stainless steel or titanium. The tube is sufficiently thin as to minimize eddy current losses and thereby provide adequate field strength within the flow passage without excessive power consumption and without giving rise to undue heat in the tube and surrounding coils. Alternatively, the non-magnetic flow tube may be formed of non-metallic material such as reinforced fiber glass or nylon. The advantage of a metal flow tube is that it also acts as an electrostatic shield.

Disposed about flow tube 10 are electromagnetic coils to establish an electromagnetic field in the tubular passage. The coils are preferably in the form of a pair of saddle-shaped coils 11 and 12 which are contoured to conform to the curvature of the flow tube. The coils are symmetrically disposed on the upper and lower halves of the flow tube.

A pair of insulated electrodes 13 and 14 are installed at diametrically-opposed points in the meter, the electrodes passing through the various metal and non-metallic layers and having their heads flush with the wall of the flow passage which is protectively coated by a liner 15. This liner which is of Teflon, neoprene or other suitable material that is non-reactive with respect to the fluid being measured, is provided with integral end flanges 15A and 15B.

Concentrically disposed about flow tube 10 is a heavy-duty metal case 16 which, in practice, may be in split form to facilitate assembly thereof, the case halves being welded together. The case is supported between and welded to two mounting flanges 17 and 18, which encircle the ends of flow tube 10. The liner flanges 15A and 15B lie against the outer faces of mounting flanges 17 and 18 to produce a seal when the mounting flanges are joined to the flanges of fluid inlet and outlet pipes.

Thus as shown in FIG. 1, mounting flange 17 is bolted to the complementary flange 19 of an inlet pipe 20, the liner flange 15A being pressed therebetween to seal off the flow tube 10. Also provided is an annular gasket 21 interposed between the mounting flange 17 and the pipe flange 19. A similar arrangement is provided for the outlet pipe (not shown).

The flange-enclosed annular region defined by case 16 and flow tube 10 is partly occupied by coils 11 and 12. Case 16, when it is formed of an iron or other ferromagnetic material, provides a return path for the magnetic flux produced by the coils. But when non-ferromagnetic material is used for the case, a magnetic shell (not shown) may be placed within the annular region around the coils to create a return path.

The annular region between case 16 and flow tube 10 is filled by a rigid potting compound, preferably constituted by a glass-filled epoxy or other high-strength insulating material having low shrinkage characteristics. In practice, potting compound in liquid form is injected into the annular region through a bore in the case which is later plugged. The potting compound is then dried and oven-cured to form a rigid sleeve of potting material.

Thus, the lined, thin-walled flow tube is backed by the potting material sleeve and reinforced by the heavy-duty case. The flow tube, when metallic, is sufficiently thin to minimize eddy current effects but the pressure rating of the flow meter is not determined by the flow tube, as in the conventional flowmeter, but by the combination of the flow tube, the potting sleeve and the case, which combination is capable of withstanding very heavy fluid pressures.

While there has been shown and described a preferred embodiment of a high-pressure electromagnetic flowmeter in accordance with the invention, it will be appreciated that many changes and modifications may be made therein without, however, departing from the essential spirit thereof.

I claim:

1. An electromagnetic flowmeter comprising:
   A. a relatively thin flow tube of non-magnetic material providing a passage for a fluid to be measured,
   B. coils disposed on the exterior of the tube to create an electromagnetic field within the passage, said coils being constituted by a pair of saddle-shaped coils symmetrically arranged on the upper and lower halves of the tube and contoured to conform to the curvature of the tube,
   C. a thick-wall case concentrically surrounding the tube to define an annular region which is partly occupied by the coils, said case being formed of ferromagnetic material to form a return path for magnetic flux produced by said coils,
   D. a pair of mounting flanges attached to the ends of said flow tube, the ends of said case being affixed to said flanges whereby said annular region is enclosed thereby, and
   E. a potting compound of rigid insulating material filling said annular region whereby said tube is reinforced by said case to provide a flowmeter having a high pressure rating.

2. A flowmeter as set forth in claim 1, wherein said flow tube is formed of stainless steel.

3. A flowmeter as set forth in claim 1, wherein said flow tube is formed of fiber glass.

4. A flowmeter as set forth in claim 1, wherein said potting compound is a glass-filled epoxy.

5. A flowmeter as set forth in claim 1, further including a pair of electrodes disposed at diametrically opposed positions on said flow tube and insulated therefrom.

6. A flowmeter as set forth in claim 1, further including an insulating liner disposed within said flow tube and having end flanges which lie against the outer faces of said mounting flanges.

* * * * *